(12) United States Patent
Park et al.

(10) Patent No.: US 6,989,102 B1
(45) Date of Patent: Jan. 24, 2006

(54) ALGINATE GEL BASED ADSORBENTS FOR HEAVY METAL REMOVAL

(75) Inventors: Hyun Gyu Park, Taejeon (KR); Kyung Hwa Kim, Taejeon (KR); Myeong Yun Chae, Taejeon (KR); Eu Gene Oh, Taejeon (KR); Eun Yeol Lee, Seoul (KR)

(73) Assignee: Samsung General Chemicals Co., Ltd., Chungnam (KR)

( * ) Notice: Subject to any disclaimer, the term of this patent is extended or adjusted under 35 U.S.C. 154(b) by 0 days.

(21) Appl. No.: 09/469,818

(22) Filed: Dec. 22, 1999

Related U.S. Application Data (62) Division of application No. 09/103,491, filed on Jun. 24, 1998, now abandoned.

(30) Foreign Application Priority Data

| Jul. 1, 1997 | (KR) | ............................................. 97/30493 |
| Dec. 29, 1997 | (KR) | ............................................. 97/77054 |

(51) Int. Cl.
    *C02F 1/28* (2006.01)

(52) U.S. Cl. ......................... 210/679; 210/688; 210/694
(58) Field of Classification Search ................. 210/679, 210/688, 694
See application file for complete search history.

(56) References Cited

U.S. PATENT DOCUMENTS

| 4,876,232 A | * | 10/1989 | Barkatt | ........................ 210/688 |
| 5,055,402 A | | 10/1991 | Greene et al. | ............... 435/174 |
| 5,385,741 A | * | 1/1995 | Rinn et al. | ................... 210/688 |

FOREIGN PATENT DOCUMENTS

| KR | 92-11300 | 7/1994 |
| KR | 94-13575 | 7/1994 |
| KR | 95-16813 | 7/1995 |
| KR | 95-17756 | 7/1995 |

* cited by examiner

*Primary Examiner*—Ivars Cintins
(74) *Attorney, Agent, or Firm*—Licata & Tyrrell P.C.

(57) ABSTRACT

An alginate gel adsorbent to remove heavy metal ions according to the present invention is prepared by adding dropwisely 0.1–5 wt % alginate solution to a polyvalent cationic solution thereby cross-linking alginic acid with polyvalent cations. An alginate gel adsorbent containing activated carbon capable of simultaneously removing heavy metal ions and organotoxic materials, that is, activated carbon/alginate gel adsorbent, is prepared by adding dropwisely a mixed solution of 0.17–10 wt % of alginate and 0.1–10 wt % of activated carbon powder to a polyvalent cationic solution thereby cross-linking alginic acid with polyvalent cations in order to immobilize polyvalent cation to alginic acid containing activated carbon. The polyvalent cationic solution is selected from the group consisting of calcium chloride ($CaCl_2$), strontium chloride ($SrCl_2$), barium chloride ($BaCl_2$) and aluminium chloride ($AlCl_3$). A flat board or a thin membrane coated alginate gel adsorbent can be prepared by coating alginate gels onto a supporter such as paper, wood plate and textile fabrics. The alginate gel adsorbent for water purification can be applied to a water purifier as well as a process of wastewater treatment. The alginate gel coated onto a supporter is prepared by immersing a supporter in 0.05–5 wt % alginate solution so that the supporter may uniformly adsorb the alginate solution, immersing the supporter in a polyvalent cationic solution thereby forming alginate gel on the surface of the supporter, and drying the supporter formed with alginate gel thereon.

10 Claims, 5 Drawing Sheets

ALGINATE GEL BASED ADSORBENTS FOR HEAVY METAL REMOVAL

This application is a divisional of U.S. patent application Ser. No. 09/103,491, filed Jun. 24, 1998, now abandoned.

FIELD OF THE INVENTION

This invention relates to an alginate gel adsorbent for water purification to remove mainly heavy metal ions as well as nasty smelling and tasting materials, organotoxic materials, etc. More particularly, the present invention relates to an alginate gel adsorbent for removing heavy metal ions in use for water purification, which is prepared by adding an alginate solution or an alginate solution containing activated carbon to a polyvalent cationic solution thereby forming alginate gel. Furthermore specifically, a bead type alginate gel adsorbent is prepared by adding alginate solution to a polyvalent cationic solution thereby cross-linking alginic acid with polyvalent cations. A capsule type alginate gel adsorbent is prepared by adding a polyvalent cationic solution containing a viscosity increasing agent to alginate solution. A coated alginate gel adsorbent is prepared by coating alginate gel onto a supporter, which is prepared by immersing a supporter in alginate solution, immersing the supporter in a polyvalent solution and drying the supporter formed with alginate gel thereon.

BACKGROUND OF THE INVENTION

The drinking water, industrial wastewater or drainage needs its effective purification due to being contaminated with heavy metal ions, nasty smelling and tasting materials, organotoxic materials, etc.

If heavy metal ions are intaken in the human body through food chain of an ecosystem in spite of small amount, they are not eliminated from the body but continuously accumulated in the body, which causes harmful effects in many ways to the physiological process of the body.

The conventional methods for removal of heavy metal ions in the rivers, underground water or wastewater have been proceeded by using the chemical precipitation, ion exchange resin, separation membrane, etc. However, in case of using the chemical precipitation method, an abundant sludge produced after purification with precipitation method becomes a secondary contaminant and the heavy metal ions in low concentrations can not be easily removed by this method. Also, in case of the removal using ion exchange resin or separation membrane, it is difficult and expensive to treat the polluted water containing a lot of heavy metal contaminant.

Recently, the development of biological techniques using living organisms for the removal of heavy metal ions as an alternative method of solving the problems has been actively researched as a rapidly growing area of interest. The adsorption of heavy metal ions using living organism has been mainly researched with microorganisms even though it is possible to use the polymers originated from plants and animals. This is based on the facts that natural materials originated from the certain microorganisms have a capability that adsorbs and removes the heavy metal ions. The most actively employed microorganism in research is algae. Because algae have the advantage that it is the most abundant in nature. Also, in case of commercializing it can be easily and inexpensively produced in large scale due to being able to be grown with the sunlight as an energy resource without organic carbon source.

The generally used adsorbent using algae for removal of heavy metal ions is mainly prepared by immobilizing whole cells of algae to the supporter such as silica gel. The method in U.S. Pat. No. 5,055,402 is a typical example of extracting or removing the heavy metal ions by immobilizing whole cells of microorganisms, especially algae, to the supporter. The immobilizing step in the patent is essential to easily separate the whole cells of algae from the purification water in removal of heavy metal ions. Because it is difficult to apply the method using filtering or centrifuging to the industrial process even though solid algae can be separated from liquid purification water by filtering or centrifuging in the laboratory.

On the other hand, immobilizing step for preparing the adsorbents causes subsequent difficulties as well as extra expense for immobilizing the composition for water purification using microorganisms. That is, it can happen that the adsorption capability of algae is decreased as a result of immobilizing and that algae is desorbed from the immobilizing supporter in the middle of the water purification process. Also, the price of cells of algae is not reasonable because algae are not yet commercially available for use of water purification, furthermore they are not suitable for use of water purification because cells of algae emit a chromatic component and spread unique odor in case of contacting with water.

It is known for a composition of the cell membrane of algae to take main part in showing characteristics that algae adsorb heavy metal ions. One of compositions composing of cell membrane of algae is alginic acid. Also, it is known that alginic acid has 240,000 of molecular weight and water adsorption capacity of 200 to 300 fold greater than its weight. Even though it chemically belongs to carbohydrate, alginic acid is capable of adsorbing heavy metal cations by using the method such as ion exchange because it has anion as a natural polymer containing carboxylic group. Korean Patent Laid-Open No. 95-17756 discloses that alginate salt removes heavy metal ions using its characteristics of heavy metal ions adsorption. Also, the invention of the patent application discloses a system comprising of a reaction container to stir a mixture of a purification composition and a solution containing heavy metal ions, and a filtering container to separate the metal ions by filtering due to not being considered the immobilizing process. However, the method using such a separated process is too expensive and not practical to apply to the water purification process on a large scale. Also, it can show difficulty in the separation process because sodium alginate increases the viscosity of treating water by absorbing the treating water in the water purification process due to its high absorption property.

The materials with irresolvability not being removed by microorganisms such as algae can be removed by using the adsorption apparatus containing an activated carbon in the water purification process. Also; in some cases, an activated carbon powder is added to the mixture in the middle of the chemical precipitation purification process.

In order to treat heavy metals polluted water, there are a highly effective purification method of treating with microorganisms, a physicochemical purification method, and an activated carbon purification method of not treating with microorganisms. Due to manufacturing diverse materials in the chemical industry, the wastewater from a factory is various. Accordingly, the compositions and concentrations of wastewater are diverse. There are so many cases capable of utilizing the characteristics of the adsorption method using an activated carbon in chemical engineering because there are a variety of materials not capable of being biologically decomposed or organotoxic materials.

Conventionally, the two-step process has been used in order to remove heavy metal ions and organotoxic materials in treating water. However, the removal of heavy metal ions was not well performed. Also, the two-step process itself is highly expensive as well as ineffective. Accordingly, it is demanding the development of a water purification composition to remove all of them effectively.

It has been conventionally used the method using a reverse osmotic pressure membrane as a composition for water purification in the area of purifier to remove polluted materials of drinking water. However, there is disadvantage that the reverse osmotic pressure membrane removes up to the mineral components such as calcium, potassium, magnesium, sodium, etc. which is useful to the body as well as all of heavy metal ions, organic materials, etc. It is because the reverse osmotic pressure membrane does not have selectivity for those components. Also, the reservoir is easily contaminated by bacteria due to low rate of purification, which causes a high expense because it need a special apparatus.

Recently, to overcome such disadvantages of the method using the reverse osmotic pressure membrane, it is widely being developed the water purifier which can be used in a manner of directly connecting to a water pipe. As a water purification apparatus for water purifier, there are cartridge containing hollow filament membrane and activated carbon (Korean Pat. Laid-Open Nos. 92-11300 and 95-16813), cartridge containing ion exchange resin and activated carbon (Korean Patent Laid-Open No. 94-13575), etc.

In case of using the cartridge containing hollow filament membrane and activated carbon, there is a problem that the removal capability of heavy metal ions is very low. Also, in case of using the cartridge with ion exchange resin and activated carbon connected to a water purifier, there are problems of high expense for purification and no selectivity for metal ions.

Accordingly, the present inventors have developed alginate gel for water purification to effectively, selectively remove heavy metal ions and organotoxic materials in a water purifier as well as heavy metal polluted water system.

OBJECTS OF THE INVENTION

An object of this invention is to provide an alginate gel adsorbent in use for removing heavy metal ions for water purification.

Another object of this invention is to provide an alginate gel adsorbent for water purification which can be prepared as a bead type, a capsule type or a coated alginate gel adsorbent.

A further object of this invention is to provide an alginate gel adsorbent for water purification which can accelerate the rate of water purification by preparing a thin alginate gel adsorbent.

A further object of this invention is to provide an alginate gel adsorbent for water purification which can be recycled after removing heavy metals from the alginate gel by desorption.

A further object of this invention is to provide an alginate gel adsorbent for water purification which can be stored in a dried state capable of being treated with ease.

A further object of this invention is to provide an alginate gel adsorbent for water purification which can select a supporter which makes it easy to be used in the water purification process.

A further object of this invention is to provide an alginate gel adsorbent for water purification which is able to maintain enough mechanical strength.

A further object of this invention is to provide an alginate gel adsorbent for water purification containing activated carbon to simultaneously remove heavy metal ions and organotoxic materials in polluted water.

A further object of this invention is to provide an alginate gel adsorbent for water purification which can be used as a filter filler of a water purifier as well as batch type and continuous type of a wastewater purification process.

A further object of this invention is to provide a method of preparing an alginate gel adsorbent for water purification.

Other objects and advantages of this invention will be apparent from the ensuing disclosure and appended claims.

SUMMARY OF THE INVENTION

An alginate gel adsorbent for water purification to remove heavy metal ions according to the present invention is prepared by adding dropwisely 0.1–5 wt % alginate solution to a polyvalent cationic solution thereby cross-linking alginic acid with polyvalent cations.

An alginate gel adsorbent for water purification containing activated carbon capable of simultaneously removing heavy metal ions and organotoxic materials, that is, activated carbon/alginate gel adsorbent, is prepared by adding dropwisely a mixed solution of 0.1–10 wt % of alginate and 0.1–10 wt % of activated carbon powder to a polyvalent cationic solution thereby cross-linking alginic acid with polyvalent cations in order to immobilize polyvalent cation to alginic acid containing activated carbon.

The polyvalent cationic solution is selected from the group consisting of calcium chloride ($CaCl_2$), strontium chloride ($SrCl_2$), barium chloride ($BaCl_2$) and aluminium chloride ($AlCl_3$). The amount of the polyvalent cationic solution used is 0.1–50 wt % and the preferable amount is 0.5–10 wt %.

The alginate gel adsorbent can be prepared as a bead type and a capsule type. Also, a flat board or a thin membrane coated alginate gel adsorbent can be prepared by coating alginate gels onto a supporter such as paper, wood plate and textile fabrics. The alginate gel adsorbent for water purification can be applied to a water purifier as well as a process of wastewater treatment.

The alginate gel coated onto a supporter is prepared by immersing a supporter in 0.05–5 wt % alginate solution so that the supporter may uniformly adsorb the alginate solution, immersing the supporter in a polyvalent cationic solution thereby forming alginate gel on the surface of the supporter, and drying the supporter formed with alginate gel thereon.

The alginate gel adsorbent according to the present invention can be recovered through desorption process after used in the water purification process.

BRIEF DESCRIPTION OF THE DRAWINGS

The present invention will be described with reference to the accompanying drawings of which.

DETAILED DESCRIPTION OF THE INVENTION

The alginic acid capable of adsorbing heavy metal ions is a linear polymer represented as the following formula (I):

wherein G is gluronic acid and M is mannuronic acid.

An alginate gel adsorbent to remove heavy metal ions according to the present invention is prepared by adding dropwisely 0.1–10 wt % alginate solution to a polyvalent cationic solution.

Alginate acid salt can be used as alginate in this invention. Sodium alginate is preferably used. The polyvalent cationic solution is selected from the group consisting of a solution of calcium chloride ($CaCl_2$), strontium chloride ($SrCl_2$), barium chloride ($BaCl_2$) and aluminium chloride ($AlCl_3$). The amount of the polyvalent cationic solution used in this invention is 0.1–50 wt % and the preferable amount is 0.1–10 wt %.

The alginate gel adsorbent in the present invention is prepared as a bead type or a capsule type alginate gel adsorbent. Also it can be prepared as a flat board coated or a thin membrane coated alginate gel adsorbent by coating alginate gel onto the surface of supporter such as paper, wood plate and textile fabrics. Whichever type is formed, the thinner is thickness of the alginate gel adsorbent, the faster is the rate of adsorption for removal of heavy metal ions.

A bead type alginate gel adsorbent which is prepared by a process comprising adding dropwisely 0.1–10 wt % alginate solution to a polyvalent cationic solution thereby cross-linking alginic acid with polyvalent cations, which has the advantages that the preparation method is simple and that the application to column is easy.

A dried bead type alginate gel adsorbent can be prepared by drying further a bead type of alginate gel adsorbent. In the process of preparing the dried bead type alginate gel adsorbent, if an alginate solution containing powder such as starch, wooden powder and mud powder is added to a polyvalent cationic solution, it makes for the dried bead type alginate gel adsorbent to be capable of preserving the spherical shape for a long time as well as treating and storing with ease in a dried state.

A capsule type alginate gel adsorbent is prepared by adding dropwisely a polyvalent cationic solution containing a viscosity increasing agent to 0.1–5 wt % alginate solution. The capsule type alginate gel adsorbent especially has a high adsorption capability, for example, the amount of its lead adsorption is 500 mg/g in case of a bead type and a coated alginate gel adsorbent, while the amount of its lead adsorption is 1500 mg/g in case of a capsule type alginate gel adsorbent.

An alginate gel adsorbent coated onto a supporter is prepared by immersing a supporter in 0.05–5 wt % alginate solution so that the supporter may uniformly adsorb the alginate solution, immersing the supporter in a polyvalent solution thereby forming alginate gel on the surface of the supporter, and drying the supporter formed with alginate gel thereon. It is preferable to use paper, wood plate and textile fabrics. The reason is that the alginate gel is not separated from the supporter during the water purification process due to forming Van-der-Waals bonding or hydrogen bonding between the gel and the sugars of the supporter.

By using the method of coating alginate gel onto the surface of supporter, it is possible to obtain a thin type alginate gel adsorbent, which makes it possible to speeds up treating water by preventing the retention of the diffusion rate. Also, the thin type alginate gel adsorbent can be used in a dried state, which gives to be treated with ease. Furthermore, the supporter is selectively prepared as a form which can be easily applied to each water purification process and the water purification process can be carried out by rotating a rotation board which several alginate gel adsorbents are bound to with an specific interval.

The alginate gel adsorbent according to the present invention can be used to simultaneously adsorb heavy metal ions and organochemical materials, which is manufactured by adding a solution containing the materials having adsorption capability to a polyvalent cationic solution. The representative examples of the materials are zeolites and activated carbon powder.

The alginate gel adsorbent containing activated carbon can be used to simultaneously remove heavy metal ions and organotoxic material. The activated carbon/alginate gel adsorbent is prepared by adding dropwisely a mixed solution of 0.1–10 wt % of alginate and 0.1–10 wt % of activated carbon powder to a polyvalent cationic solution, thereby cross-linking alginic acid with polyvalent cations.

The activated carbon/alginate gel adsorbent is prepared by immersing the surface of the alginate gel adsorbent in a 0.05–5 wt % alginate solution, and immersing the alginate gel adsorbent in a polyvalent cationic solution. The coated activated carbon/alginate gel adsorbent prevents the effluence of an activated carbon dust in the composition and increases adsorption capability of heavy metal ions. The smaller is the size of an activated carbon/alginate gel, the faster is the rate of removal by adsorption of materials such as organotoxic materials, heavy metal ions, etc.

The alginate gel adsorbent according to the present invention can be used in a batch process or a continuous process such as column. Especially, an activated carbon/alginate gel adsorbent can be mainly used as a filter filler of a water purifier.

The alginate gel adsorbent in the present invention can be effectively used to remove toxic heavy metal ions in the water system. In case of using a conventionally used reverse osmotic pressure membrane to remove toxic heavy metal ions, the method extracts all of the organic materials, inorganic metal ions, etc. Thus, owing to not having selectivity, it removes mineral components such as calcium, potassium, magnesium, sodium, etc. However, the alginate gel adsorbent according to this invention has the characteristics that selectively adsorb to remove the only heavy metal ions without removing mineral components. The alginate gel adsorbent can be also used to recover precious metal ions such as gold, platinum, uranium, etc.

Furthermore, in case of an activated carbon/alginate gel adsorbent, both heavy metal ions and organotoxic materials can be simultaneously removed through the activated carbon/alginate gel adsorbent. The activated carbon/alginate gel adsorbent can be preserved as a dried state and used as a filler of column with ease. Furthermore, it makes to recover an activated carbon/alginate gel adsorbent.

The alginate gel adsorbent in the present invention can be recovered through the process of desorption after used in the process of water purification. Nitric acid, chloric acid or sulfuric acid is used as a desorbent.

The present invention may be better understood by reference to the following examples which are intended for purposes of illustration and are not to be confined as in any way limiting the scope of the present invention, which is defined in the claims appended hereto.

EXAMPLES 1–5

Preparation of a Bead Type Alginate Gel Adsorbent 1 ml of 1 wt % sodium alginate solution was added to 1 wt % calcium chloride ($CaCl_2$) solution to prepare a bead type alginate gel adsorbent of Example 1 having a diameter of 2.5 to 3.0 mm by an ordinary method.

A bead type alginate gel adsorbent of Example 2 was prepared in the same manner as described in Example 1 except for using 3 ml of 1 wt % of sodium alginate solution.

A bead-type alginate gel adsorbent of Example 3 was prepared in the same manner as described in Example 1 except for using 100 ml of 1 wt % of sodium alginate solution. 50 ml of 2 wt % sodium alginate solution was added to 5 wt % calcium chloride ($CaCl_2$) solution to prepare a bead type alginate gel adsorbent of Example 4 having a diameter of 4.2 mm.

The dried bead type alginate gel adsorbent of Example 5 having a diameter of 1.0 mm was prepared by drying the bead of alginate gel adsorbent prepared by mixing 50 ml of 1 wt % sodium alginate solution with 1 wt % of calcium chloride ($CaCl_2$) solution.

EXAMPLES 6–7

Preparation of a Capsule Type Alginate Gel Adsorbent

A mixed solution of 1 ml containing 1.3 wt % calcium chloride ($CaCl_2$) and 0.26 wt % xanthan gum was added to 0.5 wt % sodium alginate solution to prepare 2 g of a capsule type alginate gel adsorbent of Example 6 having a diameter about 4.0 mm.

A capsule type alginate gel adsorbent of Example 7 was prepared in the same manner as described in Example 6 except for using 3 ml of a mixed solution of calcium chloride ($CaCl_2$) and xanthan gum.

EXAMPLES 8–11

Preparation of a Coated Alginate Gel Adsorbent

Figure 1:
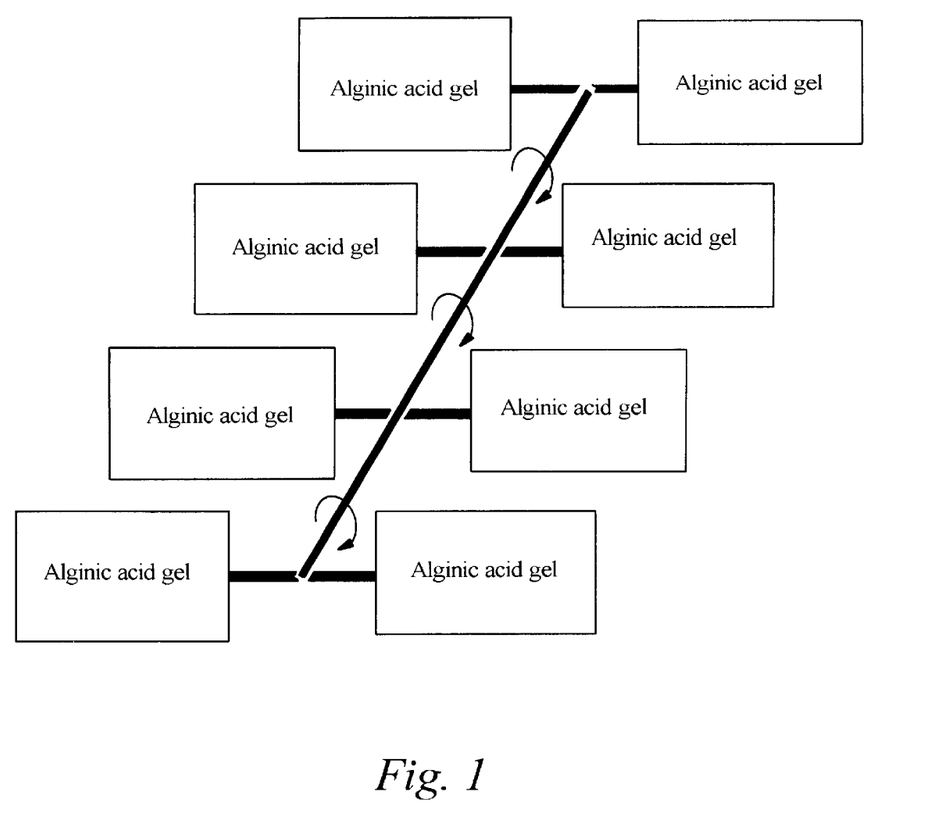
FIG. 1 is a schematic drawing of the water purification process using alginate gel adsorbents having large surface area in accordance with the Examples of the present invention.
Figure 2A:
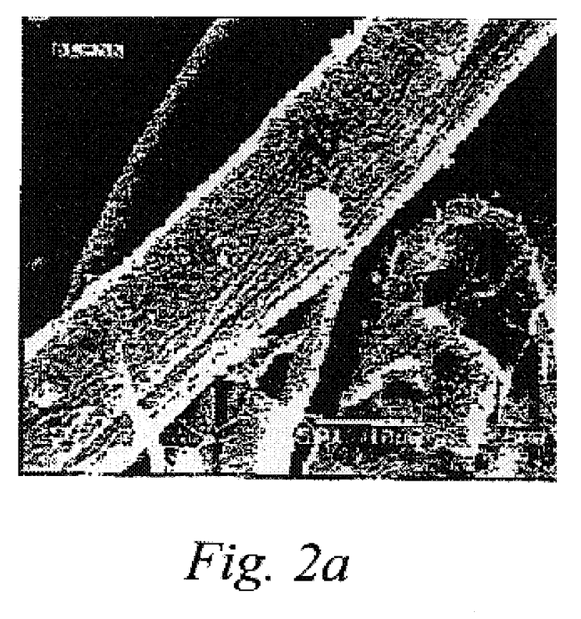
FIG. 2(A) is a photograph enlarged the surface of the conventionally used filter paper to 2500 times.
Figure 2B:
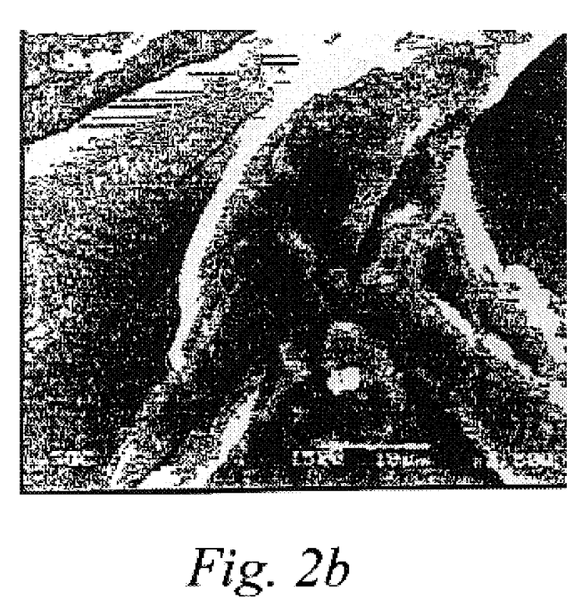
FIG. 2(B) is a photograph enlarged to 2500 times the surface of filter paper on which alginate gel is formed in accordance with the Examples of the present invention.

A filter paper of a diameter of 55 mm was immersed in the solution of 0.5 wt % sodium alginate to homogeneously absorb 0.75 g of sodium alginate solution, and then immersed in the solution of 1.0 wt % calcium chloride ($CaCl_2$) to form alginate gel onto the surface of the filter paper. A coated alginate gel adsorbent of Example 8 was prepared by drying the above filter paper. FIG. 2(A) is a photograph that is enlarged to 2500 times the surface of the filter paper used in Example 8 and FIG. 2(B) is a photograph that is enlarged to 2500 times surface of the filter paper which was dried after alginate gel was formed with sodium alginate solution onto the surface of the paper in Example 8.

A paper coated alginate gel adsorbent of Example 9 was prepared in the same manner as described in Example 8 except for absorbing 0.55 g of sodium alginate solution to the filter paper.

A textile fabric coated alginate gel adsorbent of Example 10 was prepared by forming alginate gel to a textile fabric in the same manner as described in Example 8 except for using 100% cotton fabric which is cut as a size of 5 $cm^2$.

A fiber fabric coated alginate gel adsorbent of Example 11 was prepared by forming alginate gel to a fiber fabric in the same manner as described in Example 8 except for absorbing 1.0 g of sodium alginate to 100% cotton fabric which is cut as a size of 5 $cm^2$.

EXAMPLES 12–14

Preparation of a Bead Type Activated Carbon/alginate Gel Adsorbent

Figure 3A:
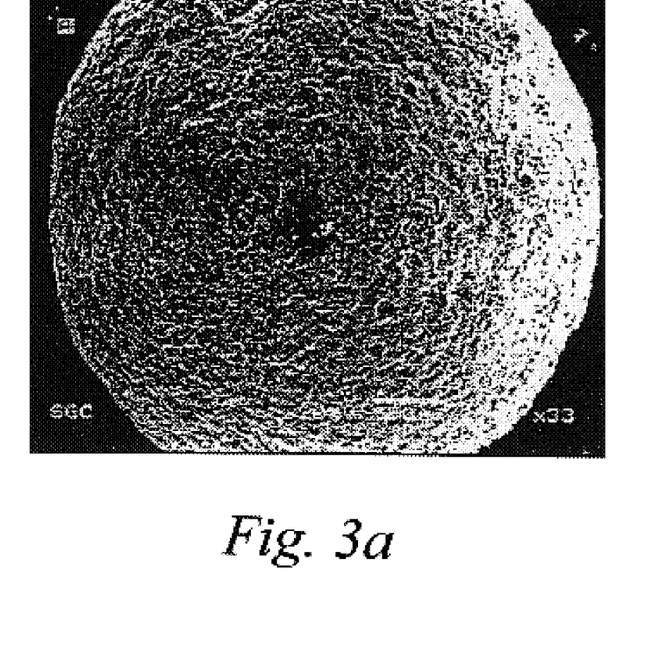
FIG. 3(A) is an electronic microscope photograph enlarged to 33 times the bead surface of alginate gel adsorbent containing activated carbon in accordance with the Examples of the present invention.
Figure 3B:
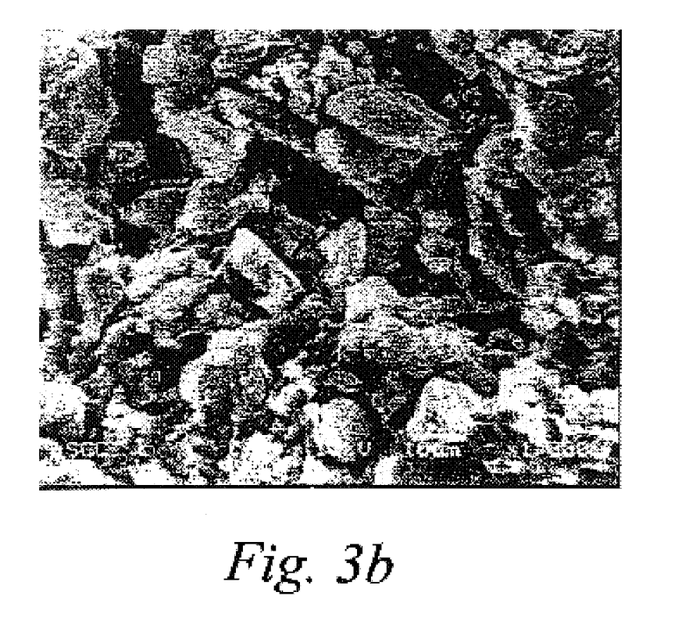
FIG. 3(B) is a photograph of an electronic microscope of 1000 magnifications of the bead surface.

A mixed solution of 1 wt % sodium alginate and 4 wt % of activated carbon powder was dropwisely added to calcium chloride ($CaCl_2$) solution to prepare a bead type activated carbon/alginate gel adsorbent. An activated carbon/alginate gel adsorbent having a diameter about 1.7 mm of Example 12 was prepared by drying the bead at 60° C. FIG. 3(A) is an electronic microscope photograph enlarged to 33 times the prepared bead surface and FIG. 3(B) is a photograph of an electronic microscope of 1000 magnifications of the bead surface.

A bead type activated carbon/alginate gel adsorbent having a diameter about 1.0 mm of Example 13 was prepared in the same manner as described in Example 12 except for using a mixed solution of 1 wt % sodium alginate and 1 wt % activated carbon powder.

A bead type activated carbon/alginate gel adsorbent of Example 14 was prepared in the same manner as described in Example 12 except for using a mixed solution of 1 wt % sodium alginate and 2 wt % activated carbon powder and a diameter of the bead being about 1.4 mm.

EXAMPLES 15–16

Preparation of a Coated Activated Carbon/alginate Gel Adsorbent

Figure 4A:
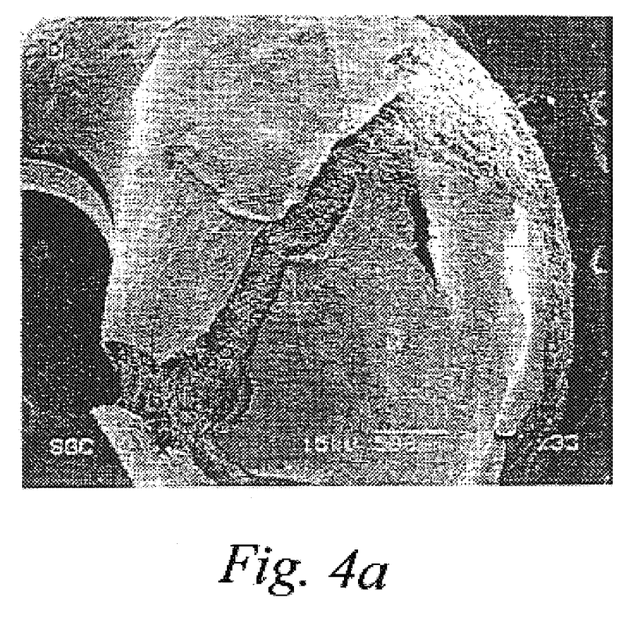
FIG. 4(A) is an electronic microscope photograph enlarged to 33 times the bead surface of alginate gel adsorbent containing activated carbon whose surface is coated in accordance with the Examples of the present invention.
Figure 4B:
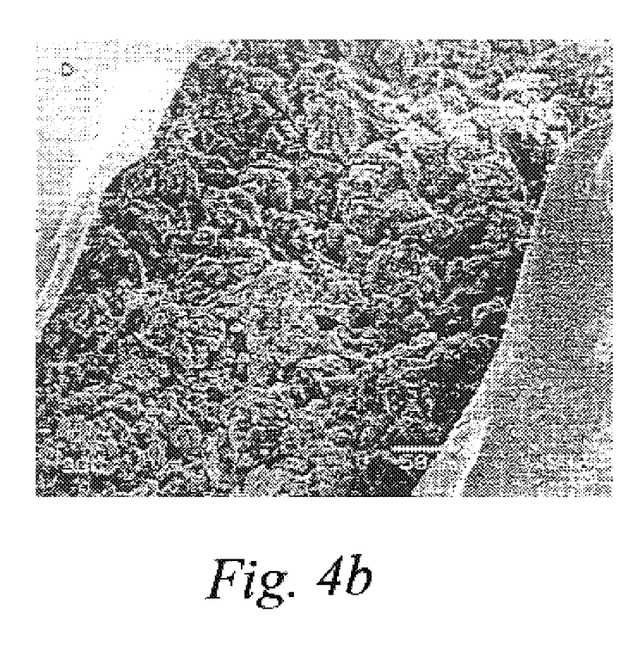
FIG. 4(B) is a photograph of an electronic microscope of 300 magnifications of the bead surface.

The bead type activated carbon/alginate gel adsorbent prepared by the method of Example 12 was immersed in 0.2 wt % sodium alginate solution to wet the surface, and then immersed in CaCl$_2$ solution. The bead type coated activated carbon/alginate gel adsorbent of Example 15 was obtained by drying the bead at 60° C. FIG. 4(A) is an electronic microscope photograph enlarged to 33 times the bead surface prepared by this method and FIG. 4(B) is a photograph of an electronic microscope of 300 magnifications of the bead surface.

The bead type activated carbon/alginate gel adsorbent prepared by the method of Example 13 was immersed in the solution of 0.2 wt % sodium alginate solution to wet the surface, and then immersed in CaCl$_2$ solution. The bead type coated activated carbon/alginate gel of Example 16 was obtained by drying the bead at 60° C.

Lead Adsorption Test of Alginate Gel Adsorbents

A bead type alginate gel adsorbent of Example 1 and a capsule type alginate gel adsorbent of Example 6 were added to the erlenmeyer flask containing 100 ml of lead solution (200 ppm) and stirred at room temperature (25° C.). Lead adsorption of the bead type alginate gel adsorbent was measured every 10, 60, 180, and 300 minutes and the result was presented in Table 1.

A couple of paper coated alginate gel adsorbent of Example 8 and a couple of fiber fabric coated alginate gel adsorbent of Example 10 were used to perform the lead adsorption test in the same manner as described above and the results were presented in Table 1.

The lead solution was prepared with Pb(NO$_3$)$_2$ and the concentration of lead was measured by atom absorption analyzer after the sample was diluted 20 times with distilled water.

TABLe 1

| alginate gel adsorbent | (units: ppm) | | | | |
|---|---|---|---|---|---|
| | 0 | 10 | 60 | 180 | 300 (min) |
| Bead (Example 1) | 200 | 196 | 167 | 155 | 154 |
| Capsule (Example 6) | 200 | 181 | 143 | 126 | 123 |
| Paper (Example 8) | 200 | 174 | 172 | 170 | 170 |
| Fiber (Example 10) | 200 | 162 | 159 | 159 | 159 |

Heavy Metal Ions Adsorption Test of a Bead Type Alginate Gel Adsorbents

A bead type alginate gel adsorbent of Example 3 was added to 500 ml solution containing heavy metal ions such as lead, chrome, cadmium, manganese, iron, zinc and copper. The mixture was stirred at room temperature (25° C.). After sampling of 50 ml, the concentration of heavy metal ion was measured with atom absorption analyzer every 10, 60, 180, and 300 minutes and the result was presented in Table 2.

TABLE 2

| | (unit: ppm) | | | |
|---|---|---|---|---|
| | First conc. | 10 min | 60 min | 300 min |
| Pb | 0.60 | 0.04 | 0.00 | 0.00 |
| Cr$^6$ | 0.90 | 0.76 | 0.74 | 0.70 |
| Cd | 0.165 | 0.06 | 0.03 | 0.02 |
| Mn | 1.04 | 0.70 | 0.53 | 0.52 |
| Fe$^{+3}$ | 0.93 | 0.34 | 0.17 | 0.05 |
| Zn | 5.31 | 3.06 | 1.83 | 1.73 |
| Cu | 5.33 | 1.57 | 0.47 | 0.34 |

Lead Adsorption Test of a Paper Coated Alginate Gel Adsorbents

Three sheets of paper coated alginate gel adsorbent of Example 9 were put into the flask containing 100 ml of lead solution (20 ppm) and stirred for 10 min to adsorb lead ions. After the papers were taken out from the solution, consecutively another three sheets of paper coated alginate gel adsorbent were added to the solution and the process was repeated.

By adsorption of the first three sheets of paper coated alginate gel adsorbents, the concentration of lead solution was decreased from 20 to 6.2 ppm. By adsorption of the second three sheets of the paper, the concentration of lead solution was decreased from 6.2 to 2.2 ppm. By adsorption of the last three sheets of the paper, the concentration of lead solution was decreased up to 0.78 ppm.

Adsorption Test for Column Filler of a Bead Type Alginate Gel Adsorbents

A bead type alginate gel adsorbent of Example 4 was filled in the glass column (9 cm×1.8 cm) and 1000 ml of lead solution was flowed to the upper direction from the bottom at a rate of 2.3 ml/min. After the lead was removed in some degree by passing through the bead type alginate gel adsorbent filled in the glass column, the solution released was collected in a portion of 13 ml. And then, each collected lead solution was diluted 20 times and the concentration of lead ions was measured by atom absorption analyzer. The result was shown in Table 3.

TABLE 3

| (unit: ppm) | | | | | |
|---|---|---|---|---|---|
| Sample No. | Conc. of lead | Sample No. | Conc. of lead | Sample No. | Conc. of lead |
| 1 | 51 | 16 | 73 | 46 | 86 |
| 3 | 68 | 21 | 74 | 51 | 89 |
| 5 | 69 | 26 | 76 | 56 | 91 |
| 7 | 69 | 31 | 79 | 61 | 93 |
| 9 | 69 | 36 | 81 | 66 | 96 |
| 11 | 71 | 41 | 83 | 71 | 98 |
| | | | | 76 | 100 |

Adosorption Test for Column Filler of an Activated Carbon/alginate Adsorbents

A bead type activated carbon/alginate gel adsorbent of 27 g according to Example 15 was filled in the round column (23.7 cm×2.8 cm) and lead treated water was flowed through column at a rate of 5 ml/min. After the lead was removed in some degree by passing through a bead type alginate gel adsorbent filled in the glass column, the solution released was collected. And then, each collected lead solution was diluted 20 times and the concentration of the lead was measured by atom absorption analyzer. The result was shown in Table 4.

TABLE 4

| | (ppm) | | | | |
|---|---|---|---|---|---|
| Time (hr) | Cd | Cu | Mn | Zn | Pb |
| 0 | 5.00 | 4.94 | 5.98 | 4.92 | 4.83 |
| 1 | 0.00 | 0.02 | 0.00 | 0.00 | 0.00 |
| 2 | 0.00 | 0.02 | 0.02 | 0.01 | 0.00 |
| 3 | 0.00 | 0.01 | 0.04 | 0.00 | 0.00 |
| 4 | 0.00 | 0.01 | 0.07 | 0.00 | 0.00 |
| 5 | 0.00 | 0.01 | 0.11 | 0.00 | 0.00 |
| 6 | 0.00 | 0.01 | 0.16 | 0.00 | 0.00 |
| 7 | 0.00 | 0.02 | 0.22 | 0.03 | 0.00 |
| 8 | 0.00 | 0.03 | 0.21 | 0.01 | 0.00 |
| 9 | 0.00 | 0.03 | 0.29 | 0.00 | 0.00 |
| 10 | 0.00 | 0.03 | 0.36 | 0.00 | 0.00 |

TABLE 4-continued

| | (ppm) | | | | |
|---|---|---|---|---|---|
| Time (hr) | Cd | Cu | Mn | Zn | Pb |
| 11 | 0.00 | 0.03 | 0.43 | 0.01 | 0.00 |
| 12 | 0.00 | 0.04 | 0.47 | 0.00 | 0.00 |

Adsorption Test of Heavy Metal Ions and Minerals Using a Bead Type Alginate Gel Adsorbent and an Activated Carbon/alginate Gel A bead type alginic gel adsorbent according to Example 3 and a coated type alginic gel adsorbent according to Example 15 were respectively added to 500 ml of solution containing heavy metal ions and minerals and stirred to adsorb heavy metal ions or minerals. The concentration of metal ion of each sample was measured with atom absorption analyzer and the result was presented in Table 5.

TABLE 5

| | Initial | Bead-type alginate gel | | Activated carbon/alginate gel | |
|---|---|---|---|---|---|
| Metal | conc. (ppm) | Equil. conc. | Removal rate (%) | Equil. conc. | Removal rate (%) |
| $Pb^{2+}$ | 5.00 | 0.00 | 100 | 0.00 | 100 |
| $Cu^{2+}$ | 4.96 | 0.23 | 95 | 0.18 | 96 |
| $Cd^{2+}$ | 5.36 | 1.13 | 79 | 1.06 | 80 |
| $Zn^{2-}$ | 5.15 | 1.84 | 64 | 2.00 | 61 |
| $Mn^{2+}$ | 4.94 | 2.43 | 51 | 2.89 | 41 |
| $Mg^{2+}$ | 5.55 | 4.53 | 18 | 5.60 | −1.0* |
| $Ca^{2+}$ | 4.80 | 58.5 | −1,100* | 16.71 | −248* |
| $Na^+$ | 7.29 | 11.48 | −57* | 8.09 | −11.0* |
| $K^+$ | 5.47 | 5.31 | 2.9 | 5.49 | −0.4* |

*The minus (−) in the Removal rate means the increase of the component of mineral.

Adsorption Test for Organic Substance Using an Activated Carbon/alginate Gel Adsorbent A coated bead type alginate gel adsorbent of 1 g according to the Example 12 was added to 100 ml of solution containing 50 ppm of respectively, benzoic acid, p-toluic acid and isophthalic acid and stirred to give adsorption. The result was shown in Table 6.

TABLE 6

| Time (h) | Benzoic acid (ppm) | Isophthalic acid (ppm) | p-Toluic acid (ppm) |
|---|---|---|---|
| 0 | 50.0 | 50.0 | 50.0 |
| 1 | 8.8 | 12.3 | 8.2 |
| 3 | 6.2 | 9.4 | 2.9 |

Adsorption Test for Organic Substance and Heavy Metal Ions Using an Activated Carbon/alginate Gel Adsorbent The dried bead type alginic gel adsorbent of 0.5 g in Example 5 and the coated bead type activated carbon/alginic gel adsorbent of 0.5 g in Examples 12, 13 and 14 were added to 500 ml of solution (5 ppm) containing p-toluic acid and heavy metal ions such as Pb, Cu, Cd, Zn and Mn respectively. After stirred until the mixture was reached adsorption equilibrium, the concentration was measured and the result was presented in Table 7.

TABLE 7

| | Initial Conc. (ppm) | Activated carbon | Examples | | | |
|---|---|---|---|---|---|---|
| | | | 5 | 12 | 13 | 14 |
| p-Touic acid | 5.00 | 0.48 | 4.68 | 0.57 | 0.78 | 0.48 |
| Pb | 4.52 | 2.19 | 0.03 | 0.13 | 0.00 | 0.00 |
| Cu | 4.92 | 2.61 | 0.43 | 0.69 | 0.28 | 0.55 |
| Cd | 5.20 | 5.16 | 1.13 | 2.06 | 0.88 | 1.43 |
| Zn | 5.26 | 5.30 | 2.36 | 3.40 | 2.09 | 2.82 |
| Mn | 4.13 | 4.18 | 2.69 | 3.17 | 2.37 | 2.90 |

In case of activated carbon as shown in Table 7, even though capability for removal of p-toluic acid is high, heavy metal ions were little removed. Although the alginate gel adsorbent not containing activated carbon in Example 5 has a high capability for removal of heavy metal ions, p-toluic acid was little removed. While, the activated carbon/alginate gel adsorbent in Examples 12–14 has a high capability for removal of p-toluic acid and heavy metal ions.

Regeneration Test for Lead-adsorption of Alginate Gel Adsorbents

Figure 5:
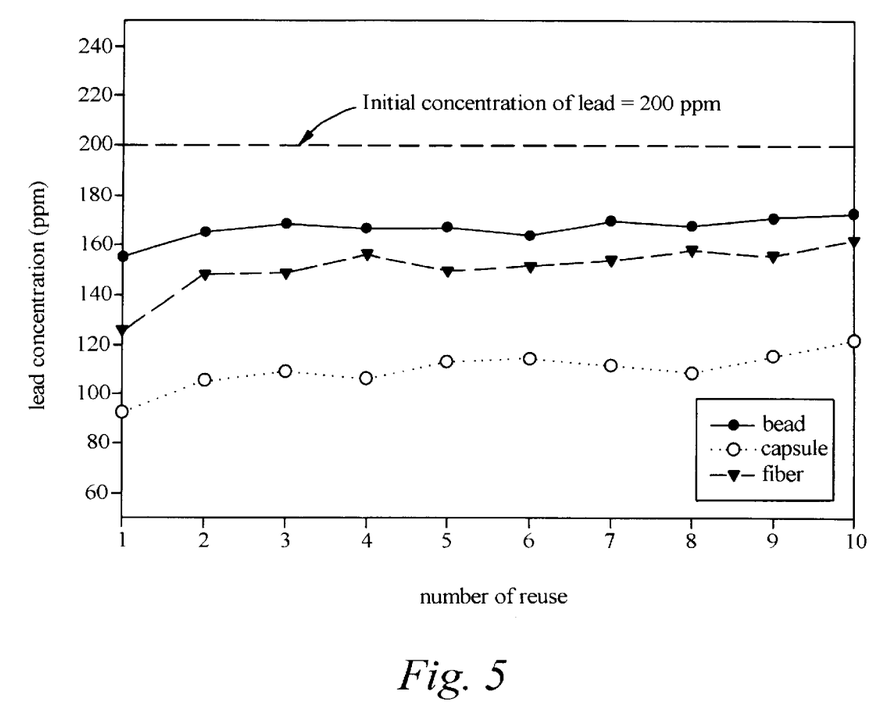
FIG. 5 is a graph showing the amount of heavy metal ions extracted from the treated water after a bead type, a capsule type, and a fiber fabric coated alginate gel adsorbent, which are reused 10 times in accordance with the Examples of the present invention.

A bead type alginate gel adsorbent obtained in Example 2, a capsule type alginate gel adsorbent in Example 7 and a fiber fabric coated alginate gel adsorbent in Example 11 were added to 150 ml of lead solution (200 ppm) and stirred for 10 min. The concentration of the lead solution was measured. The fiber fabric coated alginate gel adsorbent was used in 6 folds. The alginate gel adsorbent which was respectively added to the solution was taken out from the lead solution, washed with distilled water and stirred in 0.05 M of nitric acid ($HNO_3$) solution for 15 min. The volume of $HNO_3$ solution used was respectively 60, 96 and 48 ml for the bead type, capsule type and fiber fabric coated alginate gel adsorbents. The alginate gel adsorbent desorbed the lead was added to 150 ml of new lead solution (200 ppm) and the process was repeated. The process of lead adsorption/desorption of alginate gel was repeated 10 times and the result was shown in FIG. 5. In case of the bead type and capsule type alginate gel adsorbents, the adsorption time was 1 hr. While, in case of the fiber fabric coated alginate gel adsorbent, the adsorption time was 10 min, which indicated that the fiber fabric coated alginate gel adsorbent showed a high adsorption rate. The result showed that the gel could be used 10 times without highly decreasing of adsorption capability.

Test of a Coated Activated Carbon/alginate Gel Adsorbent

The filter filled with 160 g of coated activated carbon/alginate gel adsorbent of Example 16 was put into the column (60 mm×50 mm) which was connected to a water purifier. The filter was composed of a prefilter which was filled with activated carbon and non-woven fabric, and a hollow filament membrane filter filled with activated carbon. After 50 l of a solution containing heavy metal ions was passed through the filter under 1.5 atm, the discharged water was analyzed and the result was presented in Table 8. Also, the same test was performed with a conventional filter which was filled with hollow filament membrane and activated carbon in order to compare the result with the test result above.

TABLE 8

|  | Inflowed water (ppm) | Filter filled with activated carbon | | Filter filled with activated carbon/alginate gel | |
| --- | --- | --- | --- | --- | --- |
|  |  | Outflowed water (ppm) | Removal (%) | Outflowed water (ppm) | Removal (%) |
| K | 3.25 | 17.44 | −436.6 | 81.57 | −2409.8 |
| Na | 8.20 | 8.69 | −6.0 | 11.99 | −46.2 |
| Mg | 10.05 | 11.17 | −11.1 | 3.01 | 70.0 |
| Ca | 19.27 | 20.32 | −5.4 | 53.85 | −179.4 |
| Pb | 0.85 | 0.34 | 60.0 | 0.00 | 100 |
| Mn | 0.888 | 0.919 | −3.5 | 0.009 | 99.0 |
| Cd | 0.040 | 0.041 | −2.5 | 0.0Q | 100 |
| Cu | 4.086 | 3.654 | 10.6 | 0.00 | 100 |
| Zn | 3.043 | 2.587 | 15.0 | 0.00 | 100 |
| Fe | 1.89 | 1.21 | 36.0 | 0.00 | 100 |
| Al | 0.84 | 0.00 | 100 | 0.00 | 100 |
| Hg | 0.011 | 0.00 | 100 | 0.00 | 100 |
| As | 0.220 | 0.022 | 90.0 | 0.026 | 88.0 |
| Se | 0.024 | 0.00 | 79.2 | 0.006 | 75.0 |
| $Cr^{+6}$ | 0.16 | 0.00 | 100 | 0.00 | 100 |

Having described the present invention, however, many modifications thereto will become apparent to those skilled in the art to which it pertains without deviation from the spirit of the invention as defined by the scope of the appended claims.

What is claimed is:

1. A method of treating water for removal of heavy metals, which comprises contacting heavy metal contaminated water with an activated carbon/alginate gel adsorbent prepared by a process comprising adding dropwisely a mixed solution of 0.1–10 wt % alginate and 0.1–10 wt % activated carbon powder to a polyvalent cationic solution to form an activated carbon/alginate gel adsorbent, thereby cross-linking alginic acid with polyvalent cations, drying the activated carbon/alginate gel adsorbent, and applying a coating to the activated carbon/alginate gel adsorbent to prevent the effluence of activated carbon dust and increase adsorption capability of heavy metal ions, said coating application comprising immersing the dried activated carbon/alginate gel adsorbent in an alginate solution of 0.05–5 wt % alginate, and immersing the activated carbon/alginate gel adsorbent in a polyvalent cationic solution.

2. The method of treating water for removal of heavy metals of claim 1 wherein said alginate is an alginic acid salt.

3. The method of treating water for removal of heavy metals of claim 1 wherein said polyvalent cationic solution is selected from the group consisting of calcium chloride ($CaCl_2$), strontium chloride ($SrCl_2$), barium chloride ($BaCl_2$) and aluminum chloride ($AlCl_3$).

4. The method of treating water for removal of heavy metals of claim 1 wherein said alginate contains a powder selected from the group consisting of starch, wooden powder and mud powder.

5. The method of treating water for removal of heavy metals of claim 1 wherein the heavy metal contaminated water contains organochemical materials and wherein said mixed solution contains an adsorbent for adsorbing organochemical materials.

6. A method of treating water for purification in a water purifier, which comprises passing heavy metal contaminated water through a water purifier containing an activated carbon/alginate gel adsorbent prepared by a process comprising adding dropwisely a mixed solution of 0.1–10 wt % alginate and 0.1–10 wt % activated carbon powder to a polyvalent cationic solution to form an activated carbon/alginate gel adsorbent, thereby cross-linking alginic acid with polyvalent cations, drying the activated carbon/alginate gel adsorbent and applying a coating to the dried activated carbon/alginate gel adsorbent to prevent the effluence of activated carbon dust and increase adsorption capability of heavy metal ions, said coating application comprising immersing the dried activated carbon/alginate gel adsorbent in an alginate solution of 0.05–5 wt % alginate, and immersing the activated carbon/alginate gel adsorbent in a polyvalent cationic solution.

7. The method of treating water for purification in a water purifier of claim 6 wherein said alginate is an alginic acid salt.

8. The method of treating water for purification in a water purifier of claim 6 wherein said polyvalent cationic solution is selected from the group consisting of calcium chloride ($CaCl_2$), strontium chloride ($SrCl_2$), barium chloride ($BaCl_2$) and aluminum chloride ($AlCl_3$).

9. The method of treating water for purification in a water purifier of claim 6 wherein said alginate contains a powder selected from the group consisting of starch, wooden powder and mud powder.

10. The method of treating water for purification in a water purifier of claim 6 wherein the contaminated water contains organochemical materials and wherein said mixed solution contains an adsorbent for adsorbing organochemical materials.

* * * * *